United States Patent [19]
Lin

[11] Patent Number: 6,000,713
[45] Date of Patent: Dec. 14, 1999

[54] FOLDABLE TWO-WHEELED BABY STROLLER

[76] Inventor: Hui-Liang Lin, No. 408, Sec.3, Deng-Shan Road, Tzuen-Liau Village, Shi-Jou Shiang, Chang-Hua Hsien, Taiwan

[21] Appl. No.: 09/219,156

[22] Filed: Dec. 22, 1998

[51] Int. Cl.⁶ ...................................................... B62B 1/03
[52] U.S. Cl. ........................ 280/647; 280/652; 280/655; 280/47.19; 280/47.25; 280/47.28; 16/92; 16/103
[58] Field of Search ................................... 280/641, 645, 280/647, 650, 652, 655, 47.19, 47.25, 47.28, 47.29; 403/91, 92, 93, 96, 102, 103; 16/321, 324, 371

[56] References Cited

U.S. PATENT DOCUMENTS

D. 180,868   8/1957   Diehl ........................................ D14/3
4,846,486    7/1989   Habson ................................. 280/47.25
5,562,299   10/1996   Morrissette .............................. 280/652

*Primary Examiner*—Richard M. Camby
*Attorney, Agent, or Firm*—Rosenberg, Klein & Lee

[57] ABSTRACT

A foldable two-wheeled baby stroller includes two rear tubes, upper and lower seat rods connected to the rear tubes, a handle, a canopy support connected to upper ends of the handle, and two legs. Each end of the canopy support is pivotally connected to a connecting device, which, in turn, is securely connected to an arm of the handle. Each end of the seat rod is securely connected to a first connecting member, which, in turn, is pivotally connected to an associated rear tube. An upper end of each leg is securely connected to a second connecting member, which, in turn, is pivotally connected to the lower seat rod. When not in use, positioning pins are detached such that the legs, the seat rods, and the canopy rod can be pivoted to the storage positions which advantageous for storage and transportation.

2 Claims, 5 Drawing Sheets

FOLDABLE TWO-WHEELED BABY STROLLER

BACKGROUND OF THE INVENTION

1. Field of the Invention

The present invention relates to a foldable two-wheeled baby stroller.

2. Description of the Related Art

A typical two-wheeled baby stroller is shown in FIG. 5 of the drawings and includes a main frame 20 comprising two rear tubes 21 each having a wheel 27 attached to a lower end thereof, two front legs 25, a handle 23 attached to upper ends of the rear tubes 21, a canopy support 24 attached to the handle 23, and upper and lower seat rods 22a and 22b. However, each end of each seat rod 22a, 22b is securely connected to the rear tubes 21 via a connecting member 26 such that the seat rod 22a, 22b is not foldable. As a result, all screws on the baby stroller must be detached for storage or transportation. Detachment and re-assembly of the screws are troublesome and time-consuming, and the screws might be inadvertently lost. Each rear tube receives an arm (not labeled) of the handle, the arm including two lugs formed on a side thereof. A lever includes an eccentric section pivotally connected to the lugs in a manner that the eccentric section extends through an opening between the lugs. When the lever is pulled upwardly to disengage the eccentric section from the opening, the handle may move vertically relative to the rear tubes 21, as the eccentric section of the lever does not bear against the handle 23. However, the handle is made of aluminum and thus might be deformed by the eccentric section of the lever after a term of usage, thereby adversely affecting the positioning effect.

The present invention is intended to provide a foldable two-wheeled baby stroller that mitigates and/or obviates the above problems.

SUMMARY OF THE INVENTION

In accordance with the present invention, a foldable two-wheeled baby stroller comprises:

two rear tubes;

an upper seat rod and a lower seat rod, each end of the upper seat rod and the lower seat rod being securely connected to a first connecting member to move therewith, each said connecting member including an end with two spaced first lugs that are pivotally connected to an associated said rear tube by a first pivotal pin, a first positioning pin being detachably extended through the first lugs and the associated rear tube to prevent pivotal movement of the first connecting member;

a handle having two arms connected to the rear tubes, respectively;

a canopy support having two ends each connected to the rear tubes by a connecting device, each said connecting device including a vertical tube through which an associated said arm of the handle is extended, each said connecting device further including a horizontal tube having a cutout defined in an underside thereof such that the end of the canopy support is extended into the cutout when in a folded status, each said end of the canopy support being pivotally connected to the horizontal tube of the associated connecting device by a second pivotal pin, and a second positioning pin being detachably extended through the horizontal tube and the associated end of the canopy rod to prevent pivotal movement of the canopy rod; and two legs each having an upper end connected to the lower seat rod by a second connecting member, each said connecting member including an upper end with two spaced second lugs that are pivotally connected to the lower sear rod by a third pivotal pin, and a third positioning pin being detachably extended through the second lugs of the second connecting member and the lower seat rod to prevent pivotal movement of the second connecting member.

The cutout may be extended from the horizontal tube to the vertical tube, and the second positioning pin is extended through the horizontal tube to simultaneously tighten the horizontal tube and the vertical tube.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
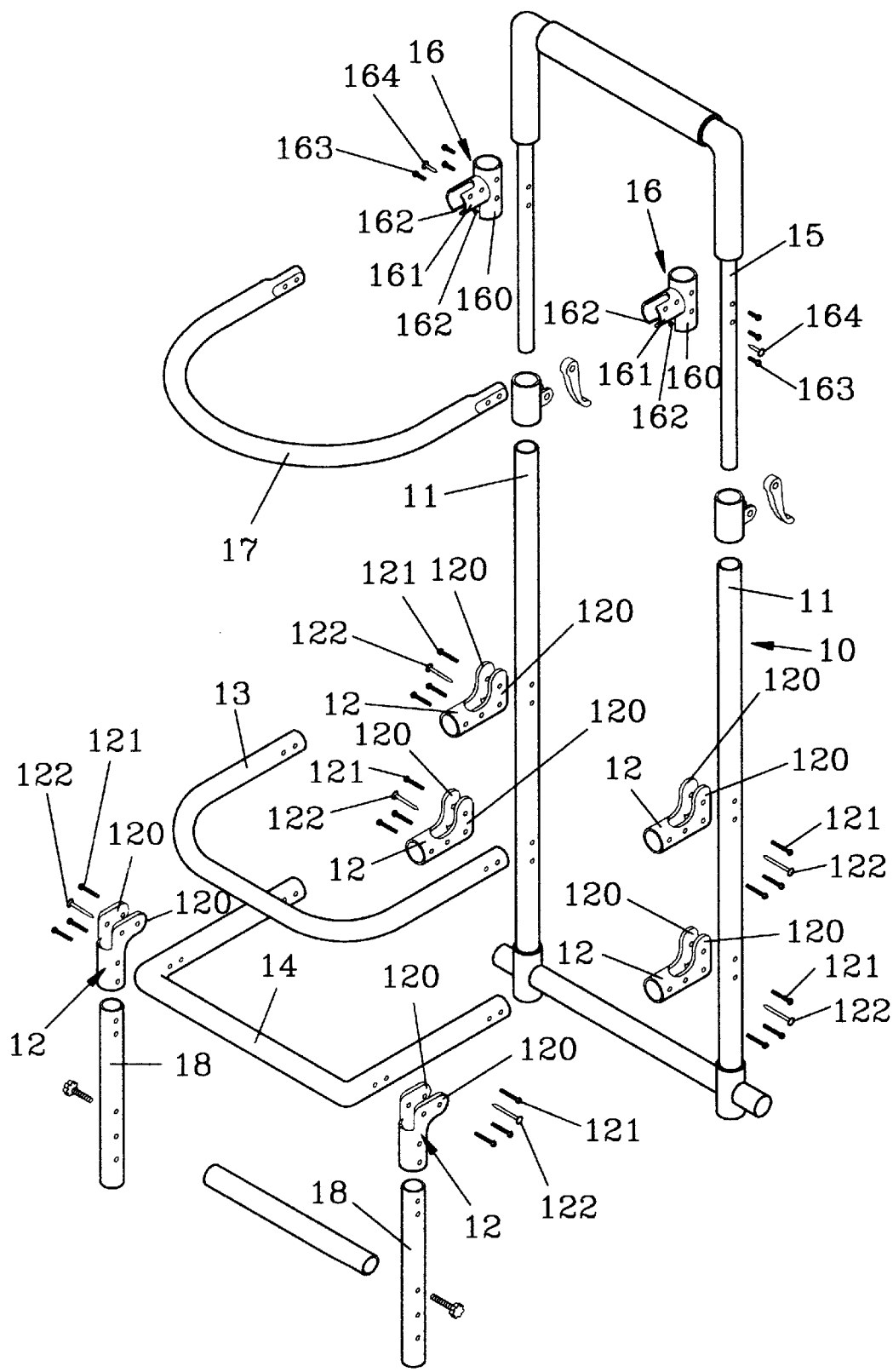
FIG. 1 is an exploded perspective view of a foldable two-wheeled baby stroller in accordance with the present invention.
Figure 2:
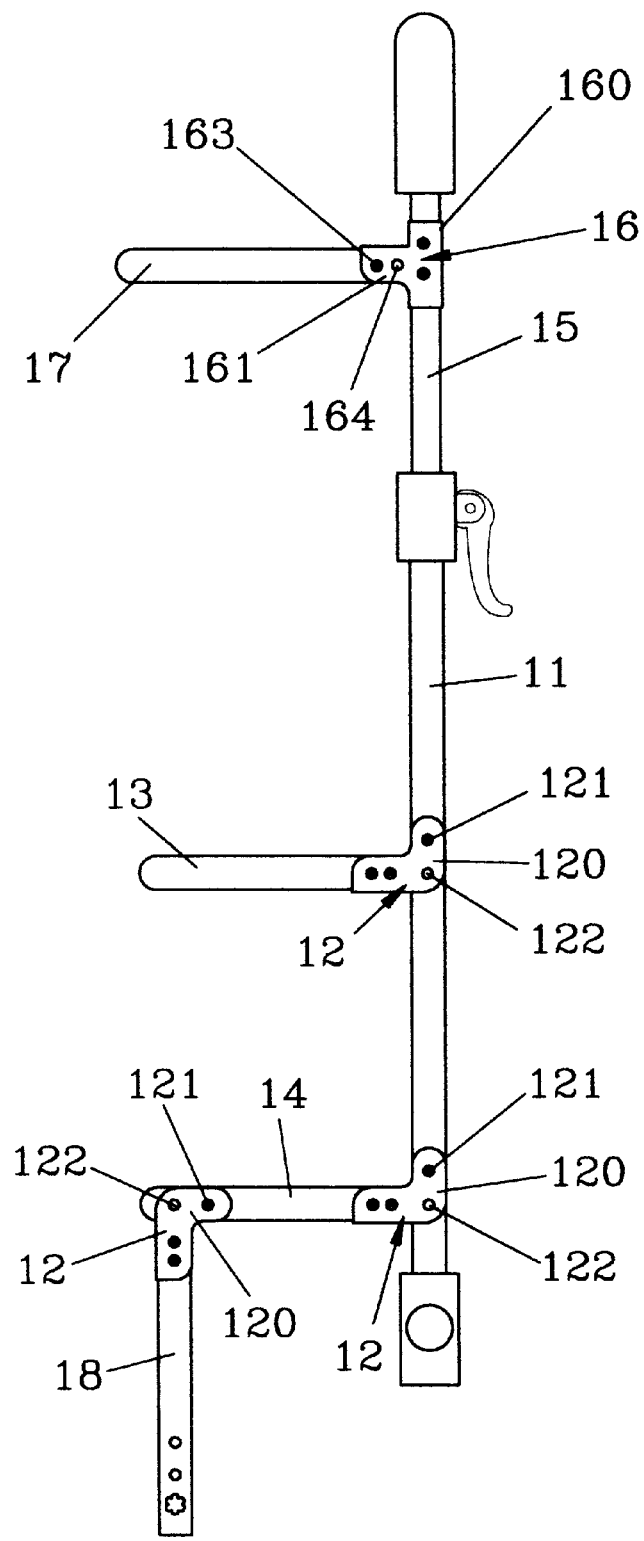
FIG. 2 is a side view of the foldable two-wheeled baby stroller in accordance with the present invention.
Figure 3:
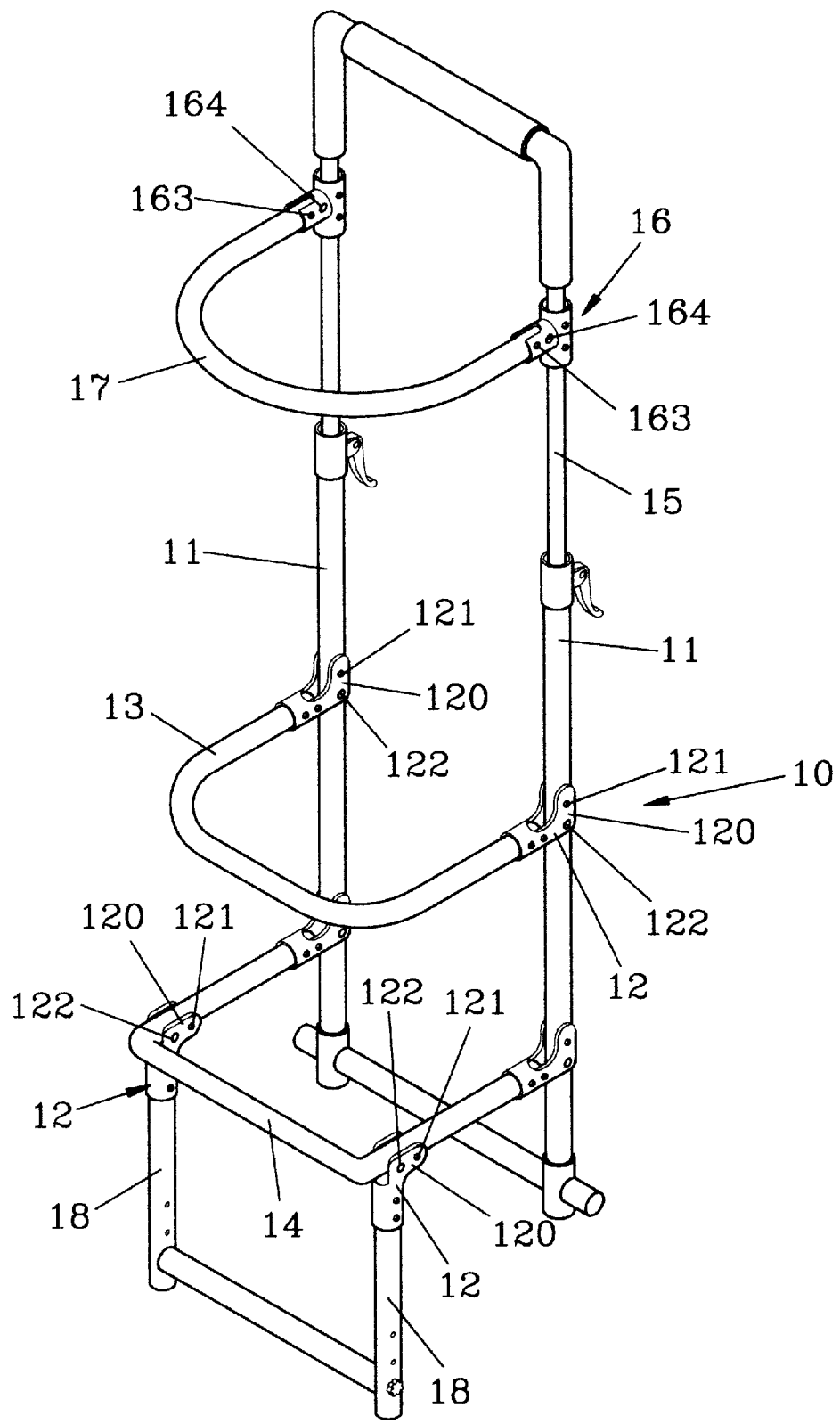
FIG. 3 is a perspective view of the foldable two-wheeled baby stroller in accordance with the present invention.

Referring to FIGS. 1 to 3, a foldable two-wheeled baby stroller in accordance with the present invention generally includes a main frame 10 comprising two rear tubes 11, upper and lower seat rods 13 and 14 connected to the rear tubes 11, a handle 15, a canopy support 17 connected to upper ends of the handle 15, and two legs 18. A wheel (not shown) is attached to a lower end of each rear tube 11.

Each end of each seat rod 13, 14 is connected to the associated rear tube 11 by a connecting member 12. Each connecting member 12 includes a first end with two spaced lugs 120 that are pivotally connected to the associated rear tube 11 by a pivotal pin 121. In addition, a positioning pin 122 is detachably extended through the lugs 120 and the associated rear tube 11 to prevent pivotal movement of the connecting member 12. Each connecting member 12 includes a second end that is securely connected to an end of the seat rod 13, 14 to move therewith.

Each leg 18 includes an upper end that is connected to the lower seat rod 14 by a connecting member 12. Each connecting member 12 includes an upper end with two spaced lugs 120 that are pivotally connected to the lower sear rod 14 by a pivotal pin 121. In addition, a positioning pin 122 is detachably extended through the lugs 120 and the lower seat rod 14 to prevent pivotal movement of the connecting member 12.

A connecting device 16 is provided to connect each end of the canopy support 17 to the handle 15. Each connecting device 16 includes a vertical tube 160 and a horizontal tube 161. The handle 15 includes two arms (not labeled) extended through the vertical tubes 160, respectively. The horizontal tube 161 includes a cutout 162 defined in an underside thereof such that the end of the canopy support 17 may be extended into the cutout 162 when in a folded status. The cutout 162 may be extended from the horizontal tube 161 to the vertical tube 160. An advantageous of this arrangement resides in that a bolt 163 may be extended through the horizontal tube 161 to simultaneously tighten the horizontal tube 161 and the vertical tube 160. Each end of the canopy support 17 is pivotally connected to the horizontal tube 161 of the associated connecting device 16 by a pivotal pin (i.e., the bolt) 163. In addition, a positioning pin 164 is detachably extended through the horizontal tube 160 and the associated end of the canopy rod 17 to prevent pivotal movement of the canopy rod 17.

Figure 4:
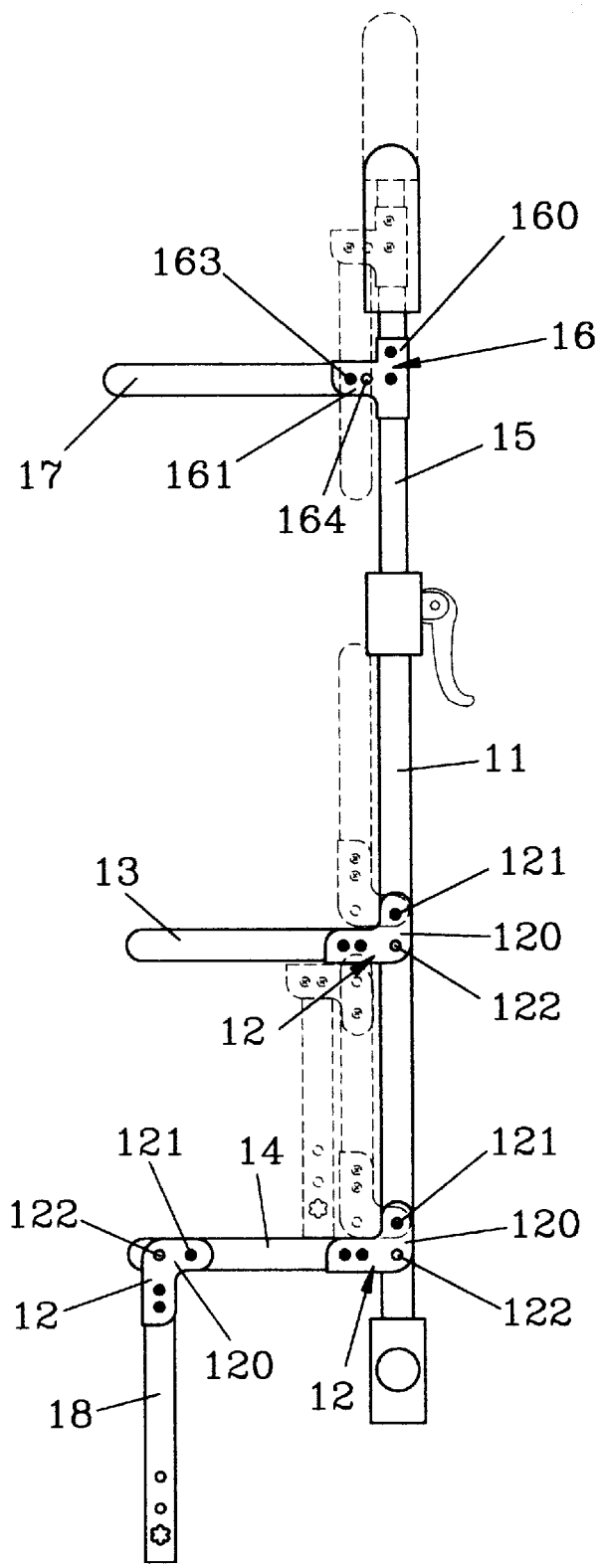
FIG. 4 is a side view illustrating folding of the foldable two-wheeled baby stroller in accordance with the present invention.
Figure 5:
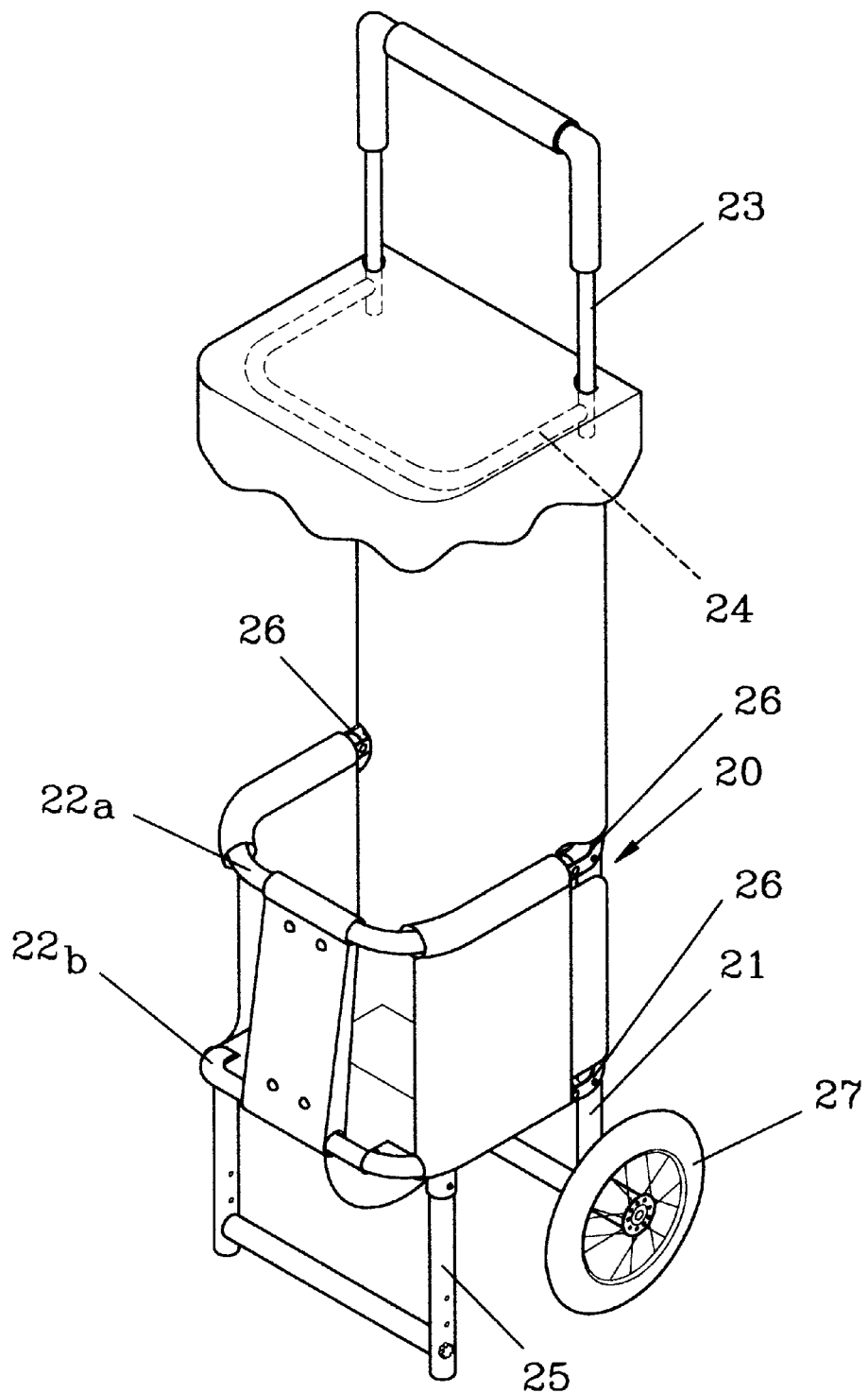
FIG. 5 is a perspective view of a conventional foldable two-wheeled baby stroller.

Referring to FIG. 4, when not in use, the positioning pins 122 and 164 are detached such that the legs 18, the seat rods 13 and 14, and the canopy rod 17 can be pivoted to the positions shown by the phantom lines. Then, the positioning pins 122 and 164 can be re-inserted. As a result, a folded small-volume two-wheeled baby stroller is provided, which is advantageous for storage and transportation.

Although the invention has been explained in relation to its preferred embodiment, it is to be understood that many other possible modifications and variations can be made without departing from the spirit and scope of the invention as hereinafter claimed.

What is claimed is:

1. A foldable two-wheeled baby stroller comprising:

two rear tubes;

an upper seat rod and a lower seat rod, each end of the upper seat rod and the lower seat rod being securely connected to a first connecting member to move therewith, each said connecting member including an end with two spaced first lugs that are pivotally connected to an associated said rear tube by a first pivotal pin, a first positioning pin being detachably extended through the first lugs and the associated rear tube to prevent pivotal movement of the first connecting member;

a handle having two arms connected to the rear tubes, respectively;

a canopy support having two ends each connected to the rear tubes by a connecting device, each said connecting device including a vertical tube through which an associated said arm of the handle is extended, each said connecting device further including a horizontal tube having a cutout defined in an underside thereof such that the end of the canopy support is extended into the cutout when in a folded status, each said end of the canopy support being pivotally connected to the horizontal tube of the associated connecting device by a second pivotal pin, and a second positioning pin being detachably extended through the horizontal tube and the associated end of the canopy rod to prevent pivotal movement of the canopy rod; and two legs each having an upper end connected to the lower seat rod by a second connecting member, each said connecting member including an upper end with two spaced second lugs that are pivotally connected to the lower sear rod by a third pivotal pin, and a third positioning pin being detachably extended through the second lugs of the second connecting member and the lower seat rod to prevent pivotal movement of the second connecting member.

2. The foldable two-wheeled baby stroller as claimed in claim 1, wherein the cutout is extended from the horizontal tube to the vertical tube, and the second positioning pin is extended through the horizontal tube to simultaneously tighten the horizontal tube and the vertical tube.

\* \* \* \* \*